March 25, 1958  A. N. SPITZ  2,827,827
PLANETARIUM PROJECTOR

Filed Jan. 24, 1955  4 Sheets-Sheet 1

INVENTOR.
ARMAND N. SPITZ
BY
ATTORNEYS

March 25, 1958 A. N. SPITZ 2,827,827
PLANETARIUM PROJECTOR
Filed Jan. 24, 1955 4 Sheets-Sheet 2
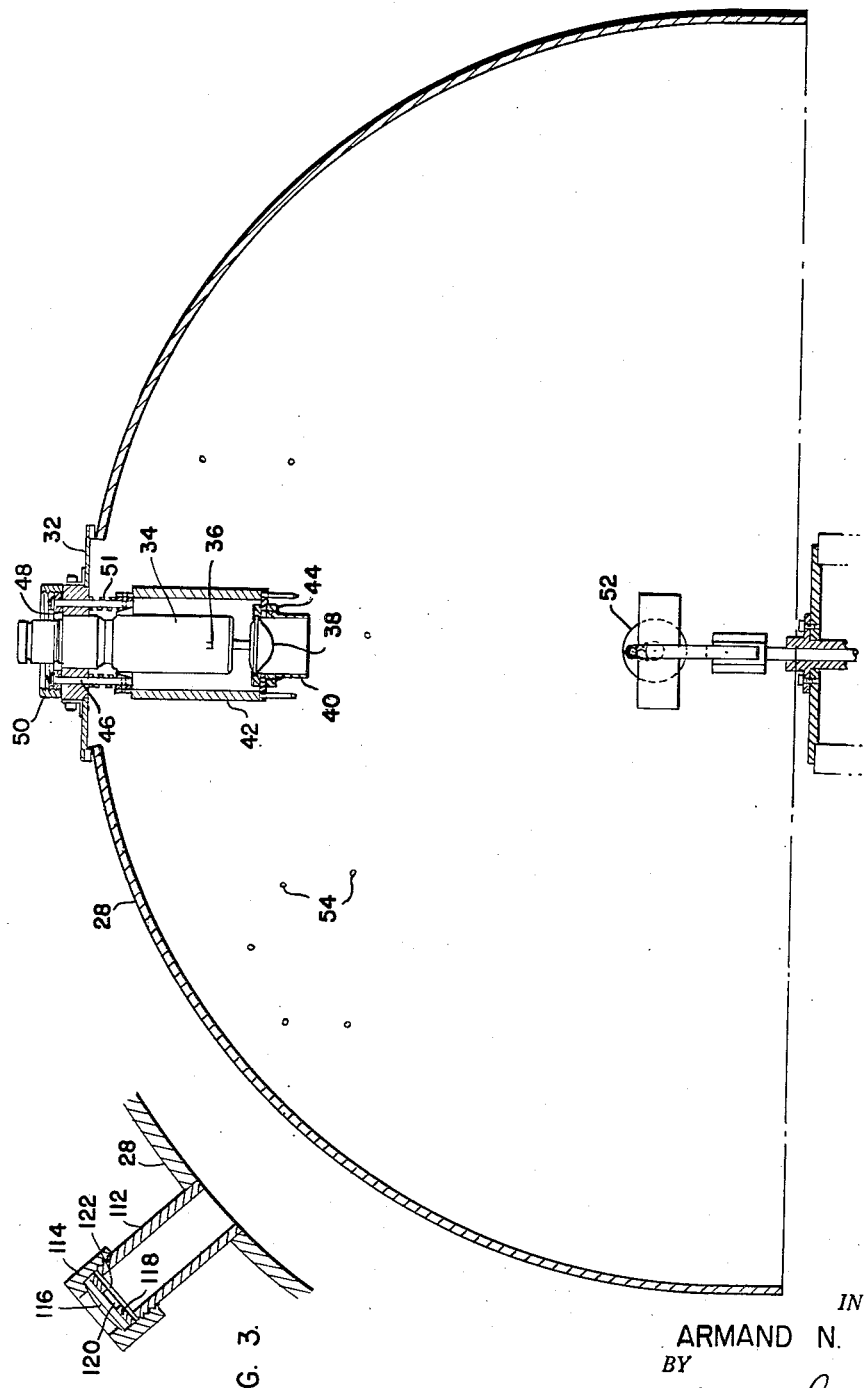
INVENTOR.
ARMAND N. SPITZ
BY
*Busser, Smith & Harding*
ATTORNEYS March 25, 1958  A. N. SPITZ  2,827,827
PLANETARIUM PROJECTOR Filed Jan. 24, 1955  4 Sheets-Sheet 3

INVENTOR.
ARMAND N. SPITZ
BY
ATTORNEYS

March 25, 1958 A. N. SPITZ 2,827,827
PLANETARIUM PROJECTOR

Filed Jan. 24, 1955 4 Sheets-Sheet 4

INVENTOR.
ARMAND N. SPITZ
BY

ATTORNEYS

United States Patent Office 2,827,827
Patented Mar. 25, 1958

2,827,827
PLANETARIUM PROJECTOR

Armand N. Spitz, Lansdowne, Pa.

Application January 24, 1955, Serial No. 483,547

3 Claims. (Cl. 88—24)

This invention relates to a planetarium and has particular reference to the provision of improved star projecting means therefor.

As disclosed in my Patent No. 2,632,359, dated March 24, 1953, acceptable projection of star images may be secured by the projection of light through pinholes in a globe from a source presenting a small area of light to the pinholes. This very simple projection arrangement is in sharp contrast with the elaborate projection systems generally used heretofore in planetaria. Pinhole projection, however, has the drawback that if very small size star images are to be produced, they cannot be satisfactorily attained through the use of known filament lamps of sufficient intensity. If a filament lamp is used as the source, the image is essentially that of the filament itself. The image is proportional to the size of the filament, other conditions being the same, and because of the requirements of heat dissipation, the necessary area presented by the filament increases with intensity of illumination. If the radius of the dome on which projection takes place is small, the filament image produced thereon is small. However, if a large size dome is involved, an inadequately bright image results from the use of a filament lamp having a sufficiently small filament to provide an image which is not too large. Up to a certain limit, in the darkness involved in a planetarium enclosure, the human eye is relatively insensitive to the shape of the projected image, being incapable of distinguishing from a reasonable viewing distance whether the spot of light which is seen is a point or a small area. Consequently, in accordance with my patent, referred to above, it has been possible, in small planetaria, to secure highly satisfactory results by utilizing the smallest available filaments and small size pinholes when the dome receiving the images was of reasonably small radius. In such case, differentiation between stars of different magnitudes was readily accomplished merely by changing the sizes of the pinholes to cause them to pass more or less light, the limitation on size being merely that of keeping within bounds the size of the spot of light produced. A large spot of the same intensity per unit area as a small spot appears brighter to the eye and, hence, satisfactory differentiation of the stars as to their magnitudes was achieved. Another drawback to a filament source of light is that it will not, in general, radiate the same intensity of illumination in all directions. This results from the fact that the filament must generally be curved or in the form of a helix in order to provide ample intensity of illumination. Because of heat dissipation requirements, such a filament cannot be made to provide equal intensity of illumination in all necessary directions. An attempt to equalize the illumination leads to a requirement of a larger presented filament area which is, in turn, detrimental to the image produced, both causing it to be larger and of recognizable shape.

The present invention is concerned with the provision of a projection system which overcomes the drawbacks of the simple type of system just referred to while, at the same time, permitting the simplicity of pinhole projection or inexpensive variations thereof. Briefly summarized, there is used in accordance with the invention a highly intense arc-type source of light which may itself be highly directional in its illuminating characteristics. A beam of light from such a source is projected upon a small spherical mirror. From this mirror, reflection of the light occurs through either pinholes or small projection arrangements with the production of intense but very small star images upon a dome even of large radius. The formation of the small images is due to the fact that, as viewed from the position of a pinhole by reflection from a spherical mirror, the source appears greatly diminished in size. Effectively, therefore, each pinhole receives its illumination from a virtual source which is minute even as compared with the apparent area of the source. Furthermore, by the arrangement which will be described, for all practical purposes the illumination intensity is substantially uniform through a hemispherical region so that the star images themselves are only affected, as to intensity, by the pinholes or other projecting elements from which they issue.

In accordance with the invention, furthermore, not only may stars be projected but there may be produced a highly satisfactory rendition of the Milky Way.

The foregoing indicated general objects of the invention and other objects particularly relating to details will become apparent from the following description, read in conjunction with the accompanying drawings, in which:

Figure 2 is a vertical section showing, in particular, the arrangement in a projector of the light source and reflecting mirror;

Figure 3 is a section showing a projecting element particularly designed for the projection of star images of major magnitude and of the Milky Way, or the like;

Figure 1:
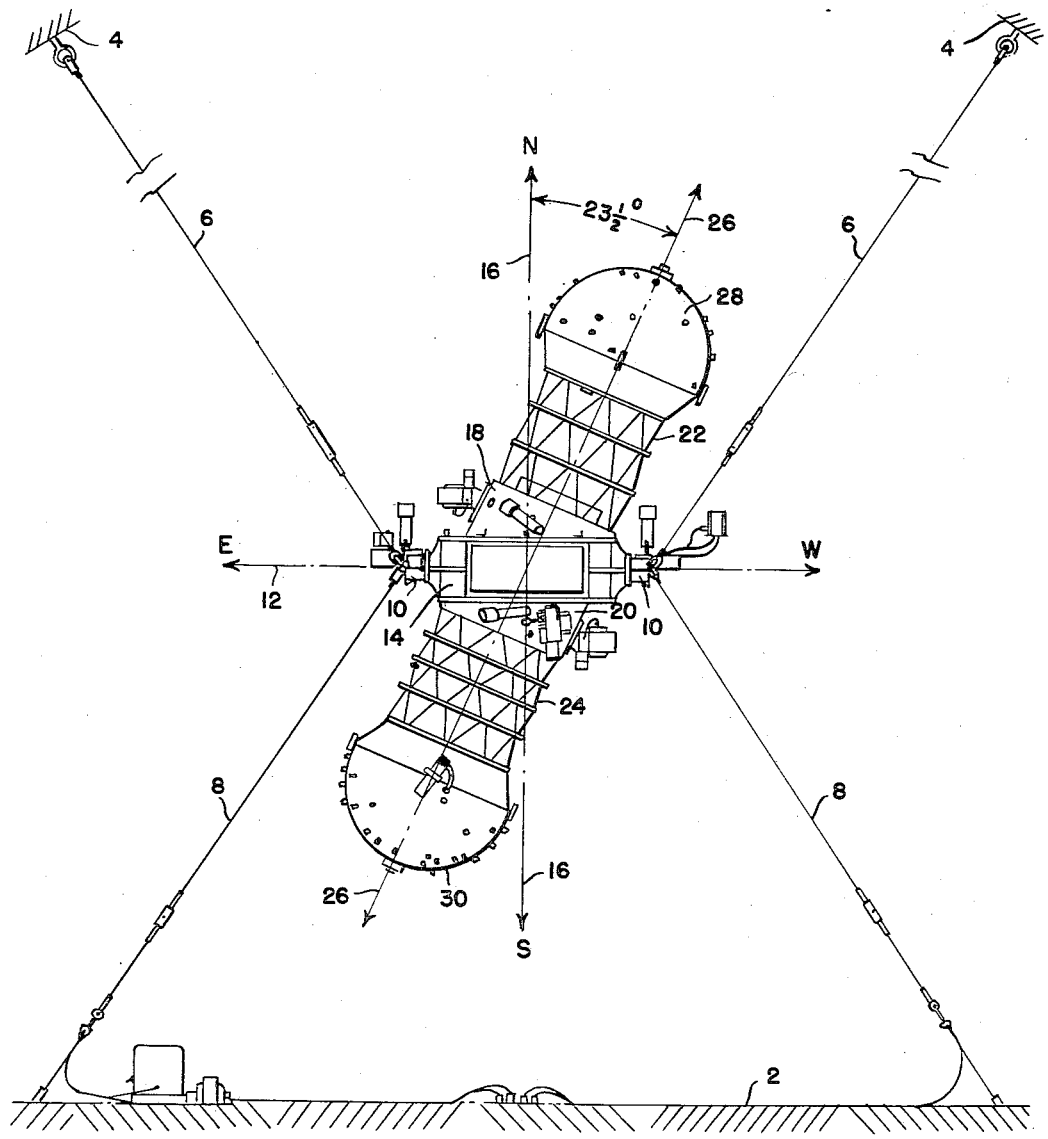
Figure 1 is an outline elevation showing the type of planetarium projector to which the invention may be applied and illustrative of the problems encountered.

Referring first to Figure 1, there is indicated at 2 the floor of a planetarium and at 4 portions of the dome thereof. In the vicinity of the center of the dome there is located a projector which is desirably mounted, as shown in Figure 1, by guy wires 6 and 8 tensioned by turnbuckles and serving to hold rigidly in position a fixed shaft the ends of which are indicated at 10. Each of the guy wires 6 and 8 illustrated is representative of a pair of guy wires diverging both in the projection illustrated and in directions normal to the plane of the figure. In contrast with prior mountings comprising heavy metal frameworks, the guy wire mounting illustrated produces great stability of the instrument and, at the same time, a minimum of occulting of the images projected on the dome. In practice it has been found that as the projecting rays cross the guy wires the occulting produced is quite unnoticeable. Ready access to the projector is also attained by this construction and there is substantially no interference with the viewing of the star images by those assembled in the planetarium in contrast with the quite substantial obstruction presented by the massive mountings heretofore used.

The axis 12 defined by the shaft 10 extends in an east-west direction from the standpoint of the reproduction of the star field. Mounted to rotate about the axis 12 is a casting 14. The rotation about the axis 12 provides change in latitude of the observation. The casting 14 in turn defines an axis 16 which rotates with it about the axis 12. The axis 16 represents the axis of the earth and is correspondingly designated by the letters N and S. Diurnal rotation is accomplished about the axis 16 by providing a central assembly illustrated by the elements 18 and 20 which rotate within the casting 14 about this axis. The central assembly defines in turn an axis 26 which moves with it and corresponds to the precessional axis perpendicular to the plane of the ecliptic. The axis 26, accordingly, makes with the axis 16 an angle approximately 23½°. Centered on the axis 26 and supported by the members 18 and 20 are cages 22 and 24 including platforms for the mounting of sun, moon and planet projectors. These latter projectors are not illustrated since they are not involved in the subject matter of the invention herein claimed. For the purpose of general understanding, however, it may be remarked that they project images in directions approximately normal to the axis 26 to simulate the apparent motions of the sun, moon and planets. Mounted at the outer ends of the cages 22 and 24 are hemispherical globes 28 and 30 which provide for the projection of the star images. These globes rotate about the axis 26 to illustrate precessional motion. It will be understood that in the complete planetarium, all of the motions above mentioned are provided by motors under suitable controls. From the standpoint of the present invention, what is to be noted is that the globes 28 have, essentially, universal angular motions requiring corresponding capabilities of the projection system to provide proper star images irrespective of the globe positions. Involved in this is also the matter of occulting star images which might otherwise be projected below the horizon. As is usual, the projection surface of the dome will normally be interrupted at the horizon, there being below this a blacked-out area which will not reflect the light from the images. Nevertheless, occulting of images below the horizon is desirable to prevent the projected rays from reaching the eyes of the observers within the dome.

Figure 5:
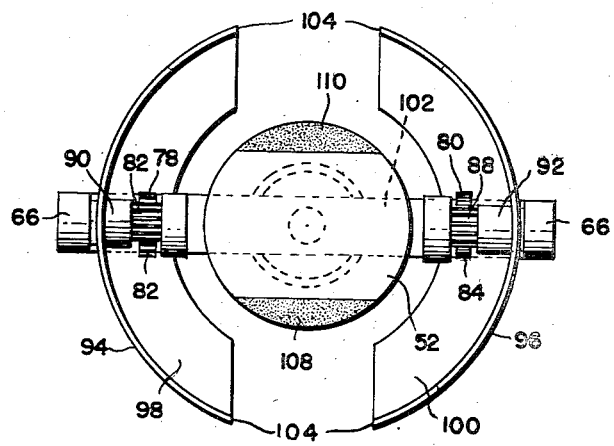
Figure 5 is a plan view of the assembly shown in Figure 4.
Figure 4:
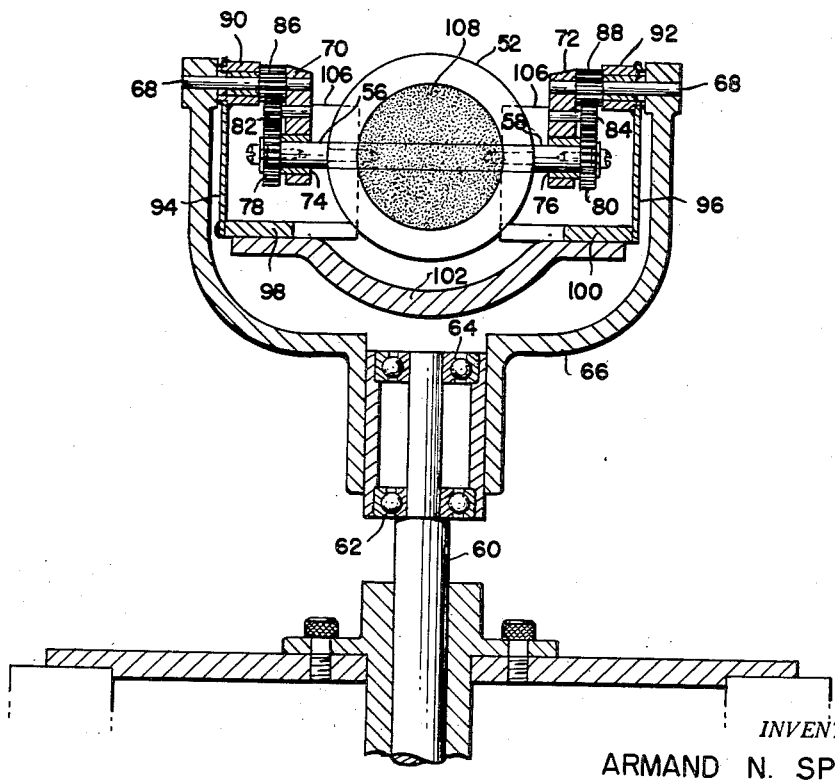
Figure 4 is a sectional view showing the mounting of a spherical reflecting mirror and associated occulting means.

Reference may now be made particularly to Figures 2, 4 and 5. One of the globes, 28, is illustrated in Figure 2 associated with a light source assembly and a reflecting assembly. It is to be understood that precisely the same arrangement is provided in connection with the other globe 30 and only one need, therefore, be described.

At the top of the globe 28 there is indicated a cover plate 32 which serves to mount the source assembly comprising the lamp 34 in which there is located an intense light source cathode area directed downwardly and indicated at 36. As will shortly become apparent, this source is required only to project its illumination downwardly, as viewed in Figure 2, through a small conical region and it has been found highly suitable to utilize for this purpose known arc-type lamps which provide small sources of the order of 0.3 millimeter diameter. Such a source is, in itself, very small, but by reflection is apparently even smaller so that as virtual sources of projection there are substantially point sources. (The use of the plural in this connection will be justified hereafter.)

In order further to increase the intensity of illumination, there is provided in alignment with the source 36 a lens 38 mounted in a housing 40 which is adjustable laterally in the lower end of a cage 42 and clamped in adjusted position by a locking nut 44. The cage 42 is provided with rods 46 slidably mounted in the cover plate 32 and secured at their upper ends in an externally threaded ring 48 surrounded by a nut 50. Springs 51 surround the rods 46 to urge the cage 42 downwardly, so that rotation of the nut 50, which continuously bears on the plate 32 under the action of the springs, serves to adjust the cage 42 and lens 38 axially to focus the beam from the source.

In line with the axis of the source 36 and lens 38 there is mounted a reflecting sphere 52 the center of which is desirably displaced toward the source from the center of the globe 28. The beam of illumination from the source 36 is concentrated by the lens 38 upon the reflector 52 and is reflected in all directions through somewhat more than a half a sphere so that rays pass through pinholes 54 in the surface of the globe, the pinholes being directed approximately radially toward the spherical reflector 52. Each pinhole 54 has essentially as its source of illumination a corresponding image of the light source as viewed by reflection from the spherical mirror. As will be apparent from the optical system involved, the virtual sources thus provided are essentially individual for the various pinholes, being found by each pinhole along an axis passing through a particular point of the spherical mirror, which point is individual to the pinhole. Thus, for the highest accuracy in projection, there must be considered the size of the spherical mirror, its displacement from the center of the globe 28, and also the parallax involved by the fact that the projector of Figure 1 will have its globes offset from the center of the dome. The layout of the pinholes 54 in the globe 28 is such as to allow for these conditions and provide a reasonable compromise. Actually, the observer is not sensitive to minor displacements of the stars with respect to each other and high accuracy of star positions is not required. It will be noted, however, that the spherical reflector 52 is of small diameter with respect to the globe 28 so that for general descriptive purposes herein it may be considered that the sources of illumination for the pinholes 54 are concentrated in the close vicinity of the center of the reflector.

While various occulting arrangements may be used, there is illustrated herein a practical occulting arrangement which constitutes the subject matter of an application of George Vaux, Gilmore L. Stitely and George A. Smith, Serial No. 483,644, filed January 24, 1955. The object of this occulting arrangement, or of such other occulting arrangement as may be used, is, in particular, to prevent to a substantial extent the projection of beams of light from the projector into the eyes of observers. For this purpose, the occulting means reduces to a great extent the probability that any rays will be projected from the globes below a horizontal plane through the projector.

Secured in the corresponding cage 22 there is a shaft 60 extending along the axis 26 on which there is mounted by means of ball bearings 62 and 64 a U-shaped bracket 66 supporting at the upper ends of its arms pins 68 which project inwardly and carry mounting elements 70 and 72, these mounting elements being rigidly fixed with respect to the bracket. The spherical mirror 52, which may be in the form of a pair of approximately hemispherical glass members surfaced with aluminum or other material to provide high reflectivity and secured to an equatorial ring, is provided with shaft extensions 56 and 58 respectively mounted in bushings 74 and 76 in the members 70 and 72. These shafts are respectively provided with pinions 78 and 80 which mesh with idler pinions 82 and 84 mounted on pins carried by the members 70 and 72 and which, in turn, mesh with pinions 86 and 88, respectively, journalled upon the pins 68. Secured to the hubs of pinions 86 and 88 are sleeves 90 and 92 which are, respectively, connected to arcuate plates 94 and 96 to which are secured heavy arcuate members 98 and 100 which are connected together below the spherical mirror by a heavy yoke member 102. The pinions 78 and 80 have twice the number of teeth of the pinions 86 and 88. By reason of its pendant weight, the assembly comprising the members 94 and 96 and 98, 100 and 102, acts as a pendulum mounted on the common axis of the pins 68. Accordingly, as the position of the fixed shaft 60 changes, the pendulous assembly just mentioned retains its position with respect to the vertical, the bracket 66 swinging about the axis of shaft 60 to maintain this condition. In other words, the pendulum swings about an axis which is constantly horizontal and perpendicular to the plane of inclination of the axis 26 with respect to the vertical. Consideration of the operation, therefore, may be reduced to consideration of what occurs as the axis of shaft 60, i. e. 26, is considered as tilting about a horizontal axis. As such motion takes place, the lamp source 36 correspondingly moves. At the same time, the sphere 52 rotates about its axis in the same angular direction but at half the angular velocity of the rotation of the axis 26.

The spherical reflector 52 is provided with a pair of non-reflecting zones 108 and 110. These zones are circular in outline and subtend at the center of the sphere angles of 90°. The two zones are diametrically opposite each other and their common axis is perpendicular to the axis of shafts 56 and 58 and is horizontal when the shaft 60 is vertical. As will be seen from Figure 4, the upper edges 106 of the members 94 and 96 are horizontal and located at a level approximately midway between the center of the reflecting sphere and its top. Between the members 94 and 96 are gaps provided by their edges 104, and these gaps are of a width corresponding to the chord subtended by an angle of 90° at the surface of the spherical mirror. As will become apparent, these gaps are required to permit incident light to strike the mirror under certain conditions to provide reflection therefrom through regions extending to 90° from the direction of incidence.

The nature of the projecting and occulting systems will become clearer from consideration of Figures 6 to 9 which show the paths of incident and reflected rays in a plane perpendicular to the axis of the shafts 56 and 58. While reflections out of that plane are involved, their nature will be generally evident from consideration of the rays in the plane.

Figures 6, 7:
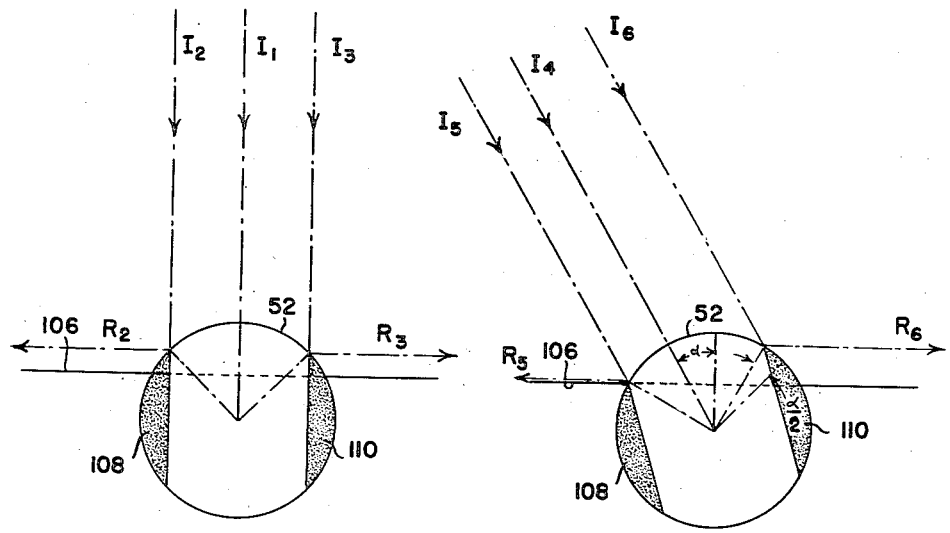
Figures 6, 7, 8 and 9 are diagrams illustrating, in particular, the operation of the occulting system.

Figure 6 shows the conditions which exist when the axis 26 is vertical with the source 36 directly above the mirror 52. A central incident ray is indicated at $I_1$. Limiting incident rays $I_2$ and $I_3$ produce horizontal reflections $R_2$ and $R_3$. (The rays $I_2$ and $I_3$ are shown as parallel though they may be slightly convergent due to the action of lens 38.) The rays $R_2$ and $R_3$ are the limiting desirable rays, and it will be noted that they are reflected from points at the upper extremities of the non-reflecting zones 108 and 110. Occulting in the plane illustrated thus is the result of these zones. In other directions, the occulting is effected by the upper edge 106 of each of the members 94 and 96. The occulting thus effected permits rays slightly below the horizontal. This is desirable, however, because in the position illustrated the uppermost globe may be somewhat above the horizon of the dome.

Passing to Figure 7, it may be assumed that the axis 26 has tilted counterclockwise so that the incident rays are as indicated at $I_4$, $I_5$ and $I_6$. It will be noted that the reflections $R_5$ and $R_6$ now take place at the upper edges of the zones 108 and 110 which have moved through an angle equal to half the angle alpha of inclination of the axis 26. The purpose of the half speed angular rotation of the spherical reflector will now be apparent: this insures a proper rotation to provide the horizontal cut-off.

Figures 8, 9:
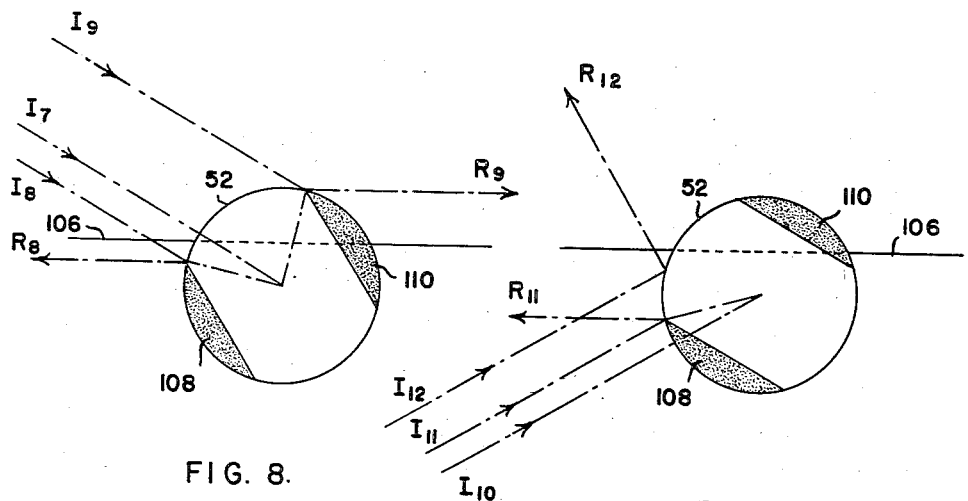

Figure 8 illustrates still further counterclockwise rotation of the axis 26. The incident rays are $I_7$, $I_8$ and $I_9$ and the limiting horizontal reflected rays are $R_8$ and $R_9$. It may be noted, however, that the ray $R_9$ under these conditions would not pass through any openings in the globe 28 but, rather, would be arrested by its bottom which is closed, though not illustrated as such in Figure 2, and is perpendicular to the axis 26. Somewhere between the positions of Figure 6 and Figure 8, therefore, depending upon the particular dimensions involved, the non-reflecting zone 110 will lose its useful occulting function.

Figure 9 shows a further rotation of the axis 26 to the extent that the incident rays are directed upwardly. The central ray is $I_{10}$. $I_{11}$ shows the incident ray which produces a horizontal reflection $R_{11}$. Both the incident and reflected rays pass through the gap between the edges 104, and this condition illustrates, therefore, the necessity for this gap. Occulting below the horizontal reflection is still produced by the zone 108. The incident ray $I_{12}$ shown in Figure 9 is approximately the outermost ray which produces a useful reflection $R_{12}$ since the closed bottom of the globe will occult reflected rays clockwise of this.

Continued rotation would produce results corresponding to those already described. It will, furthermore, be evident why two zones 108 and 110 are required since they effectively alternate their positions in a single rotation of the axis 26.

The foregoing has not described what happens in the case of rays producing reflections out of the plane discussed. However, it will be evident that occulting of these rays takes place due either to the edges 106 or the zones 108 and 110. To produce precise horizontal occulting under all conditions, it will be found that, theoretically, the edges of the zones 108 and 110 would have to change shape during the rotation. While this might well be accomplished by providing variable equivalents of these zones separate from the spherical reflecting surface but adjacent thereto, the complications of achieving this end are not warranted by practical considerations. With the arrangement illustrated, rays passing through the openings corresponding to particular stars will sometimes be directed below the horizontal. The probability that such a ray will reach an observer's eye or that it will persist for any objectionable duration of time is so small as not to warrant a greater complexity of the occulting mechanism. Furthermore, it will be noted that the stars in the vicinity of the plane of the ecliptic might well be projected from either of the globes. This is due to the fact that the reflecting mirror 52 is displaced from the center of each globe. Due to this, the star holes may be located where there is a minimum likelihood of objectionable non-occultation. For all practical purposes, therefore, the occulting system is completely satisfactory.

As will be evident from the foregoing, each pinhole 54 views as its virtual source of light a minute source which, for practical purposes, is substantially a geometrical point. The size of the pinhole defines the size of the image projected on the dome taking into account the respective diameters of the globe and dome. To a great extent, therefore, the stars of lesser magnitude may well have their intensities adjusted merely by choice of size of the pinholes. In this fashion, different size images are produced which, by reason of differences of size, have different apparent intensities.

However, particularly in the matter of first magnitude stars, greater intensities of the images are desired than can be satisfactorily produced while keeping down the sizes of the images. Accordingly, it is desirable to provide projecting assemblies in place of pinholes in the cases of such stars as illustrated in Figure 3. Each of these assemblies comprises a tube 112 fitted in an opening in one of the globes and threaded externally at its outer end to receive a clamp ring 114 which holds in assembled relationship a lens 116 of suitable focal length, an aperture plate 118 provided with a central aperture 120 and, in some cases, a filter 122 which may be colored to give the proper hue to the star involved. By the use of this arrangement, the total intensity of light passing through the aperture 120 may be focused on the dome to produce a satisfactorily small image. In such case, therefore, the apparent intensity is actually due to an increase of intensity of illumination rather than merely an increase in size of the image.

It is found, furthermore, that by the use of a film transparency in the position illustrated at 122 provided with a reproduction of the Milky Way, and by the use of a diverging lens at 116, there may be produced diffused low intensity patches of light to show the Milky Way. Other patches of light may be provided to indicate nebulae, globular clusters, Magellenic clouds, and the like.

It will be evident that even if a filament source of illumination is used, the spherical mirror reflecting arrangement will produce a minute virtual source for projection even if the filament source is fairly large. Furthermore, directional characteristics of the source are unimportant since all of the rays utilized are located within a small solid angle. By reason of the latter situation, however, much of the radiation from a filament source would be wasted as heat, and for efficiency, an arc-type source is desirable as above described.

It may be noted that the arrangement described for producing a minute virtual light source may be used in other devices than planetaria where such light sources are required for projection or other purposes.

It will be evident that various matters of detail may be changed without departing from the invention as defined in the following claims.

What is claimed is:

1. A projector comprising a substantially hemispherical perforated globe, a spherical mirror positioned radially centrally of said globe, and a high intensity light source in the zenith position within said globe above said spherical mirror directing light rays to said spherical mirror from which they are reflected to said globe passing through perforations therein, said light source and spherical mirror providing virtual light sources for each of the perforations in said globe of effective size smaller than said high intensity light source.

2. A planetarium projector comprising a substantially hemispherical opaque globe having openings therein, a convex mirror positioned approximately centrally of said globe, and a high intensity light source in the zenith position within said globe above said mirror directing light rays to said mirror from which they are reflected to said globe passing through openings therein, said light source and mirror providing virtual light sources for each of the openings in said globe, said light sources being of effective size smaller than said high intensity light source.

3. A planetarium projector comprising a substantially hemispherical opaque globe having openings therein, a convex mirror positioned approximately centrally of said globe, a high intensity light source in the zenith position within said globe above said mirror directing light rays to said mirror from which they are reflected to said globe passing through openings therein, said light source and mirror providing virtual light sources for each of the openings in said globe, said light sources being of effective size smaller than said high intensity light source, and some of said openings having members provided with lenses in alignment therewith receiving rays from said virtual light sources and directing them through a surface externally of said globe.

References Cited in the file of this patent

UNITED STATES PATENTS

| | | |
|---|---|---|
| 1,616,736 | Bauersfeld | Feb. 8, 1927 |
| 1,693,969 | Villiger et al. | Dec. 4, 1928 |
| 2,077,111 | Kent | Apr. 13, 1937 |
| 2,168,799 | Korkosz et al. | Aug. 8, 1939 |
| 2,178,352 | Unglaube et al. | Oct. 31, 1939 |
| 2,299,682 | Conant | Oct. 20, 1942 |
| 2,304,434 | Ayres | Dec. 8, 1942 |
| 2,393,310 | Crane | Jan. 22, 1946 |
| 2,448,568 | Zwillinger et al. | Sept. 7, 1948 |
| 2,483,216 | Marshall | Sept. 27, 1949 |
| 2,632,359 | Spitz | Mar. 24, 1953 |
| 2,682,803 | Korkosz | July 6, 1954 |

FOREIGN PATENTS

| | | |
|---|---|---|
| 707,877 | Great Britain | Apr. 28, 1954 |